July 22, 1924.　　　　　　　　　　　　　　　　1,501,974
M. D. STOCKING
HOPPER ATTACHMENT FOR HARVESTERS
Filed Dec. 19, 1922　　　3 Sheets-Sheet 1
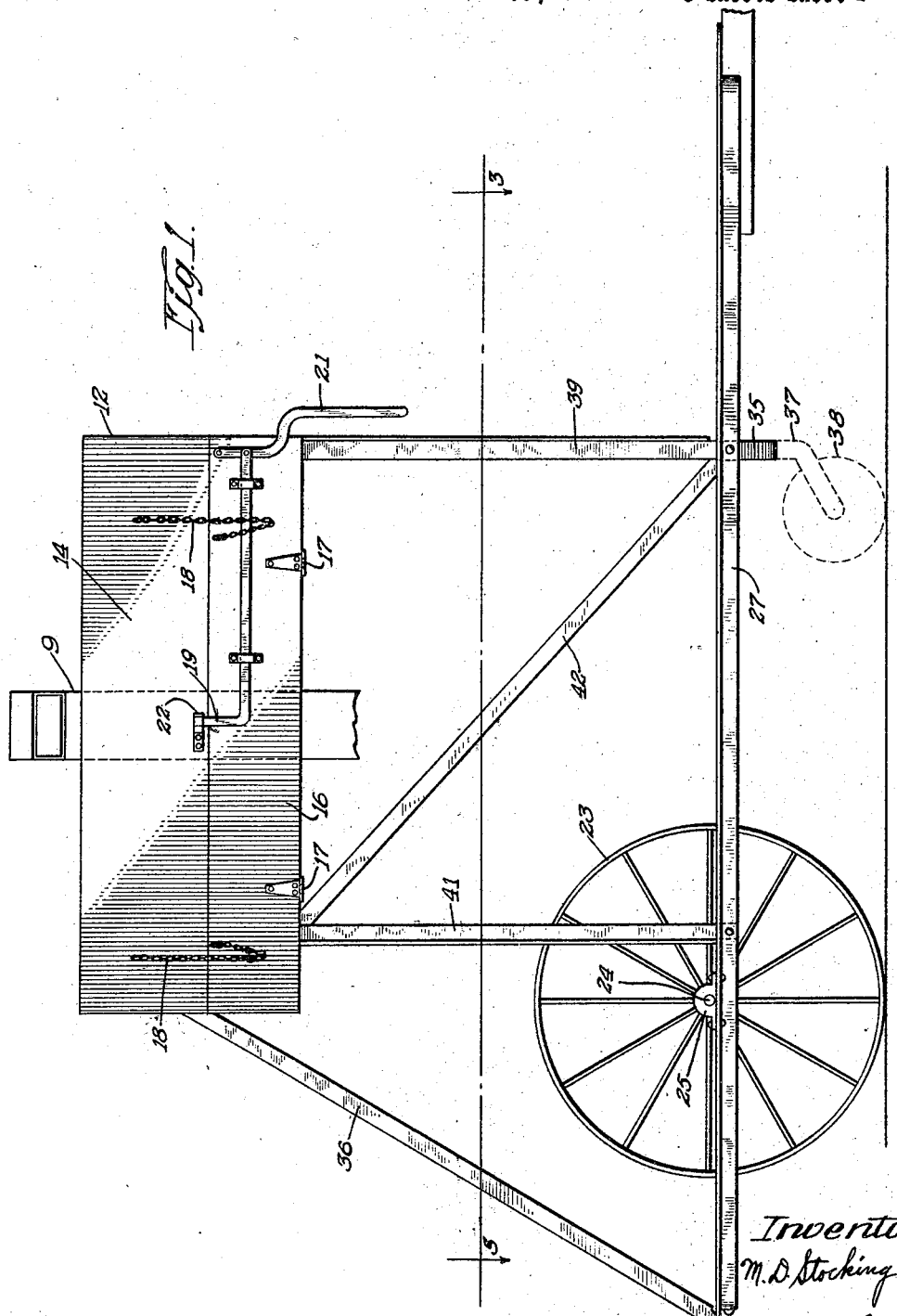

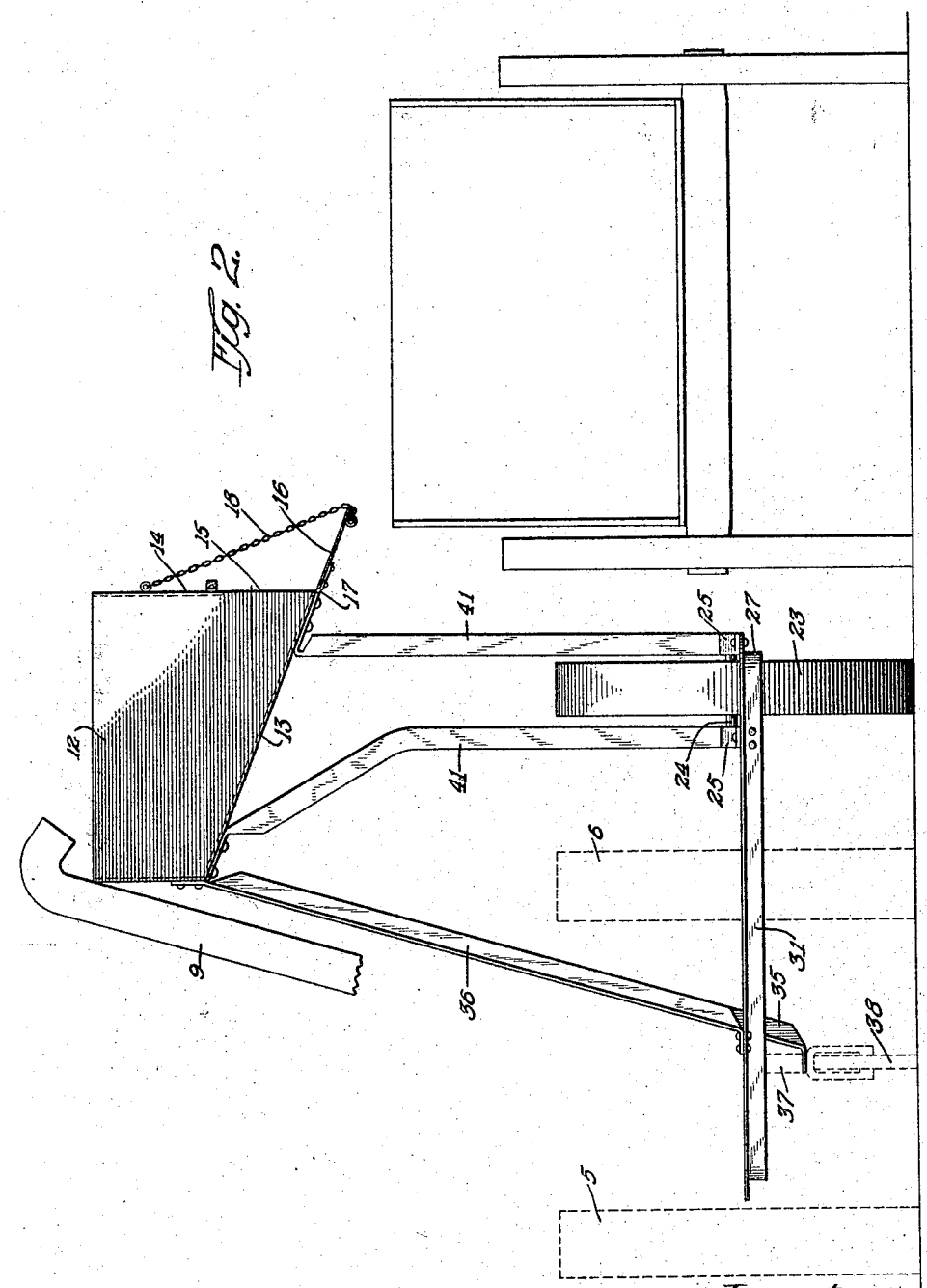

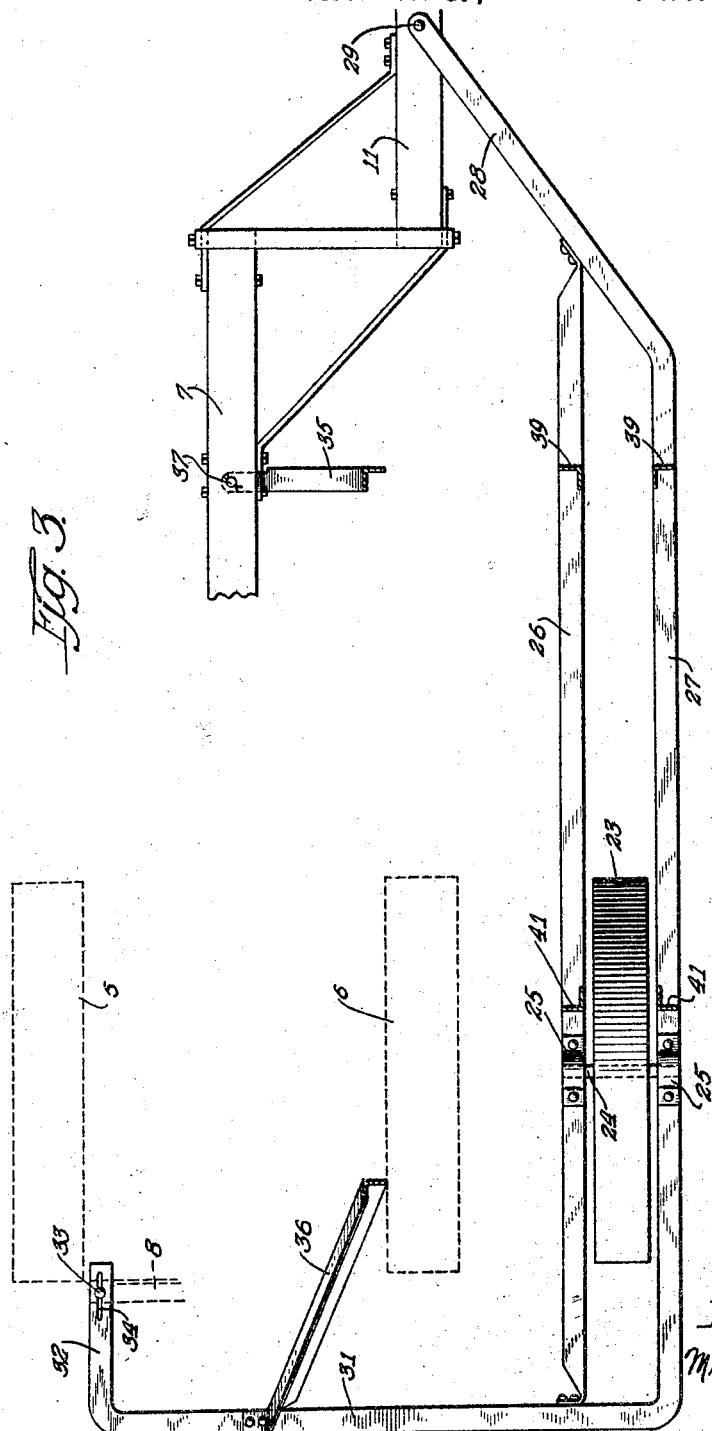

Patented July 22, 1924.

1,501,974

UNITED STATES PATENT OFFICE.

MILTON D. STOCKING, OF LINDENWOOD, ILLINOIS.

HOPPER ATTACHMENT FOR HARVESTERS.

Application filed December 19, 1922. Serial No. 607,823.

*To all whom it may concern:*

Be it known that I, MILTON D. STOCKING, a citizen of the United States, residing at Lindenwood, in the county of Ogle and State of Illinois, have invented certain new and useful Improvements in Hopper Attachments for Harvesters, of which the following is a specification.

This invention relates in general to harvesters in which the grain or corn as the case may be, after having been removed from the stalks, is elevated and discharged at one side of the harvester. My invention is, however, especially adapted for use in connection with corn-picking machines which remove the ears from the standing stalks and husk them.

In the elevating of corn the practice has been to elevate the husked ears and deliver them into a wagon drawn alongside the picker during the picking operation. This practice is objectionable among other reasons, because of the difficulty of keeping the wagon in proper relation to the picker. There has also been provided on a corn-picking machine a hopper for carrying the husked ears; but this imposes more or less heavy and cumbersome construction and materially increases the draft.

In the present invention, I have aimed to improve the handling of husked ears and the like by providing a hopper carried on a supplemental frame and supporting wheel, which frame is detachably connected to and drawn alongside of a corn picker and adapted to receive the ears delivered at one side of the elevator. The contents of the hopper will be delivered from the same side of the machine into a wagon or other receptacle alongside, although not drawn by the machine. In the use of my invention, the picking machine will operate once or more around the field, or for such distance as will be required for filling the hopper to any desired extent. The contents of the hopper will be emptied into the wagon or receptacle standing at a receiving position, this being done each time the picking machine passes such position. It follows that it is only necessary to draw a minimum load during the picking operation. Furthermore, the ears may be dumped into the wagon more easily and conveniently than under the prior practice.

Another object is to provide a supplemental hopper-carrying frame for the purpose described, including a draft bar or the equivalent connected with the same source of draft as employed for drawing the picking machine. This supplemental frame is connected with the frame of the picker so as to maintain the proper relation between the hopper and the elevator when traveling over uneven ground.

Still another object resides in the provision of a supplemental hopper and a supporting frame therefor operatively associated with the main frame of the picker, so as not to impose the hopper load on the supporting wheels thereof.

Other objects and attendant advantages will be appreciated by those skilled in this art as the invention becomes better understood by reference to the following description when considered in connection with the accompanying drawings—

Figure 1 is a side elevation showing a hopper attachment embodying my invention;

Fig. 2 is a rear view of the hopper attachment in connection with the corn picker and showing a wagon alongside a hopper in position to receive the contents thereof; and Fig. 3 is a horizontal section taken substantially on the line 3—3 of Fig. 1.

Inasmuch as the construction of the corn picker forms no part of the present invention, I have deemed it unnecessary to show it other than to locate the two main-carrying wheels 5 and 6, the tongue 7, a part 8 of the main frame, and the delivery end of the elevator 9. An offset tongue 11 is also shown, the draft being applied to this tongue section. It is well known in this type of machine that the ears of corn will be removed from the standing stalks by picker mechanism and husked and then elevated by the elevator 9 for delivery into a wagon drawn along one side of the machine. For the purpose of the present invention, the elevator 9 has been swung inwardly on the machine in order that the hopper attachment may be coupled closely to the picker.

The hopper designated generally by 12, may be of any suitable construction, but I prefer that its bottom 13 shall be inclined downwardly toward the discharge side 14 which has an opening 15 from end to end adapted to be closed by a door 16 suitably hinged as at 17 to the hopper. The door or closure will be supported in its open position shown in Fig. 2, by chains 18 and will be locked in its closed position by suitable means, such as a latch comprising a slidable bolt 19 adapted to be operated by a lever 21 into and out of engagement behind a lock plate 22 on the side wall 14.

The hopper will be carried by a suitable frame structure supplemental to the main frame of the picker. This supplemental frame is carried by a supporting wheel 23 and is attached to the frame of the picker in order to be maintained in proper relation thereto. In the present instance, the supporting wheel carries an axle 24 upon which is journaled in bearings 25, longitudinal frame bars 26 and 27. In the present instance, the forward end 28 of the supplemental frame bar 27 constitutes a draft bar attached at 29 to the offset tongue 11, which draft bar is bent laterally at its rear end providing a transverse bar 31 having a forwardly turned end 32 connected at 33 to a main frame bar 8, this connection being loose and affording fore-and-aft movement of the supplemental frame part 32 with respect to the main frame part 8, as provided by a slot 34 in said frame part 32. The upright members of the supplemental frame comprise in the present instance, front and rear hopper-supporting bars 35 and 36, respectively, attached at their upper ends to the inner end of the hopper. The front bar 35 is attached to and supported at its lower end upon the spindle 37 of a caster wheel 38 shown in dotted lines, which serves to support the tongue 7 and is part of the picker. The upright bar 36 is rigidly bolted at its lower end to the transverse supplemental frame 31. A front and a rear pair of upright bars 39 and 41 respectively, are bolted at their lower ends to the longitudinal bars 26 and 27 and at their upper ends to the bottom of the hopper at the front and rear ends thereof. One of more diagonal braces such as 42, may be used. It will thus be seen that the hopper is rigidly supported on the supplemental frame in position beneath the delivery end of the elevator to receive the material discharged therefrom, and that the principal weight of load is carried on the supporting wheel 23. It will also be noted that the supplemental frame is drawn by means of a draft bar 28 from the same source of draft as applied to the picking machine. The entire draft of the supplemental frame is moreover carried through the draft bar, the connections on the spindle 37 and through the bolt 33 serving merely to hold the supplemental frame in proper relation to the picker frame and not as draft mediums.

In operation, the supplemental frame which obviously may easily be attached to or removed from the picker will be drawn with the latter in proper operative relation thereto. That is, the hopper 12 will be carried directly beneath the delivery end of the elevator 9, so as to receive the ears of corn delivered therefrom. It will be observed that the supporting wheel 23 is positioned beneath the hopper and in substantially coaxial relation with the main supporting wheels 5 and 6 of the picker, also that the supplemental frame is attached to the picker frame at a point near the wheel 5 at the grainward side of the picker, or in other words, remote from the elevator delivery or landward side of the picker. By reason of this construction, the hopper, which is carried in an elevated position, will be swayed to the least possible extent when traveling over uneven ground. Inasmuch as the hopper and elevator are positioned in close proximity and carried on independent frames and supporting wheels in an elevated position, the liability of interference when passing over uneven ground is reduced to a minimum by reason of the connection between the two frames which causes said hopper and elevator to sway in the same direction. My improvements may be used to the best advantage by so operating the picker in a field as to pass an unloading station at relatively frequent intervals while operating the picker and to dump the contents of the hopper into a wagon or other receptacle standing at such station. In this way a minimum load is carried by the picker and the increased draft due to the supplemental frame and hopper is in no way excessive, since only a comparatively small load of corn will be carried and this only for a comparatively short distance. Furthermore, the hopper load may be conveniently discharged into the wagon, as this is done while both the picker and wagon are at a stand; whereas under the prior practice it was difficult to draw a wagon alongside of the picker in proper relation to the elevator. Furthermore, by the use of my invention there is greater tolerance in aligning the wagon and hopper, by reason of the fact that the door 16 swings downwardly and provides a delivery extension over-reaching the wagon.

My improvements may obviously be applied to any elevator in which the conditions are substantially the same as prevail in the elevating of corn by a picking machine.

It is believed that the foregoing conveys a clear understanding of the objects prefaced above, and while I have illustrated but a single working embodiment, it should be understood that changes might be made in details of construction without departing from the spirit and scope of the invention as expressed in the appended claims.

I claim:

1. In combination with a harvester having an elevator, a hopper adapted to receive the material discharged by the elevator, a supplemental wheel-supported frame carrying the hopper, draft means for said supplemental frame, and means operative between the harvester and supplemental frame for maintaining the hopper in operative relation to the elevator, said means including a transverse bar fixed to the supplemental frame and pivotally attached to the harvester at the side thereof remote from its elevator discharge end whereby said discharge end and the hopper will swing laterally substantially in unison when passing over uneven ground.

2. In combination with a harvester having an elevator, a hopper adapted to receive material discharged by the elevator, a supplemental frame carrying said hopper and supported independently of the harvester, and means connecting the supplemental frame to the harvester near the side thereof remote from said elevator whereby the discharge end of the elevator and the hopper will swing laterally substantially in unison when passing over uneven ground.

3. In combination with a harvester having a side delivery elevator, a hopper positioned at one side of and below the elevator, a supplemental frame supporting the hopper and in turn carried by a supporting wheel, a draft bar for the forward end of said supplemental frame, and a transverse bar connecting the rear end portion of said supplemental frame and elevator frame at a point thereon remote from the elevator side of the harvester for holding the hopper in predetermined relation to the elevator.

4. In combination, a harvester having two main carrying wheels and an elevator the discharge end of which is located to deliver material beyond the landward carrying wheel, a hopper positioned at said landward side of the harvester beneath said discharge end of the elevator, and a supplemental frame supporting said hopper and including a carrying wheel located beneath the hopper and an extension reaching laterally and attached to the harvester frame at a point in proximity to the grainward side thereof, whereby the discharge end of the elevator and the hopper will swing laterally substantially in unison when passing over uneven ground.

5. In combination with a harvester having an elevator discharging at the rearward side, a hopper, a supplemental frame supporting the hopper beneath said discharge end of the elevator and including a carrying wheel for bearing the weight of the hopper and its contents and including also a laterally extending frame portion attached to the harvester at the grainward side thereof whereby to maintain the hopper in operative relation to the discharge end of the elevator when passing over uneven ground.

6. In combination with a harvester having an elevator discharging at the landward side, a hopper, and a frame structure supplemental to the harvester but attached thereto for carrying the hopper in operative relation to the discharge end of the elevator, said frame structure being supported in part by a carrying wheel located beneath the hopper and having a forwardly reaching draft bar and a transversely reaching bar attached to the harvester at the grainward side thereof.

7. In combination with a harvester having an elevator discharging at the landward side, a hopper, and a frame structure supplemental to the harvester but attached thereto for carrying the hopper in operative relation to the discharge end of the elevator, said frame structure being supported in part by a carrying wheel located beneath the hopper and having a forwardly reaching draft bar pivotally attached to the harvester and a rear transversely extending frame part pivotally attached to the hopper at the grainward side thereof.

8. In combination with a harvester having an elevator discharging at the landward side thereof and having a draft pole, a hopper, and means for supporting the hopper in operative position beneath the discharge end of the elevator comprising a frame structure pivotally attached to the harvester draft pole and extending rearwardly therefrom at the landward side thereof, beneath the hopper, and thence transversely of the harvester at the rear thereof and being pivotally attached to the harvester at the grainward side thereof, and a carrying wheel for said frame structure intermediate said points of attachment to the harvester.

MILTON D. STOCKING.